United States Patent [19]

Weidmann et al.

[11] Patent Number: 4,995,447

[45] Date of Patent: Feb. 26, 1991

[54] AIR DUCTING SYSTEM FOR COOLING AIR IN THE FRONT END OF A MOTOR VEHICLE

[75] Inventors: Werner Weidmann, Weinstadt; Rainer Tiefenbacher, Leinfelden-Echterdingen, both of Fed. Rep. of Germany

[73] Assignee: Daimler-Benz AG, Fed. Rep. of Germany

[21] Appl. No.: 524,423

[22] Filed: May 17, 1990

[30] Foreign Application Priority Data

May 26, 1989 [DE] Fed. Rep. of Germany ....... 3917108

[51] Int. Cl.⁵ .................... B60H 3/00; B61D 27/00; B60K 11/02
[52] U.S. Cl. ........................................ 165/44; 165/51; 165/140; 165/903; 123/41.33; 123/41.48; 123/41.51; 123/41.7; 184/104.3; 180/68.1; 180/68.4
[58] Field of Search ............... 165/916, 41, 44, 51, 165/903, 140; 123/41.33, 41.51, 41.48, 41.49, 41.7, 196 AB; 184/104.3; 180/68.1, 68.4

[56] References Cited

U.S. PATENT DOCUMENTS

| 1,803,156 | 4/1931 | Wagner | 165/44 |
|---|---|---|---|
| 1,966,787 | 7/1934 | Buri | 123/41.49 |
| 2,168,166 | 8/1939 | Larrecq | 123/41.48 |
| 2,171,047 | 8/1939 | Richardson et al. | 180/68.1 |
| 2,216,111 | 10/1940 | Huet | 165/44 |
| 2,439,775 | 4/1948 | Kennedy | |
| 3,205,964 | 9/1965 | Biabaud | 165/44 |
| 3,428,141 | 2/1969 | Forstner et al. | 180/68.1 |
| 4,114,714 | 9/1978 | Fachbach et al. | 180/68.1 |
| 4,438,732 | 3/1984 | Seifert | 180/68.1 |
| 4,706,615 | 11/1987 | Scadding | 123/41.49 |
| 4,938,303 | 7/1990 | Schaal et al. | 123/41.48 |

FOREIGN PATENT DOCUMENTS

| 3630646 | 7/1987 | Fed. Rep. of Germany | 180/68.1 |
|---|---|---|---|
| 0859509 | 12/1940 | France | 123/41.7 |
| 0886948 | 10/1943 | France | 123/41.48 |
| 0150823 | 7/1986 | Japan | 180/68.4 |
| 0831597 | 3/1960 | United Kingdom | 180/68.1 |
| 1454636 | 11/1976 | United Kingdom | 180/68.4 |

Primary Examiner—John Ford
Attorney, Agent, or Firm—Evanson, Wands, Edwards, Lenahan & McKeown

[57] ABSTRACT

In an air ducting system for cooling air in an air duct in the front end of a motor vehicle, which is positioned with the air outlet at the underside of the front end in front of a capsule surrounding the engine compartment of the motor vehicle, a plurality of aerodynamically shaped hollow guide vanes internally traversed by a cooling medium which divide the air duct into a plurality of subducts is arranged as far as the air outlet opening at the underside of the front end in order to improve the airflow in the air duct and to cool the cooling medium.

10 Claims, 1 Drawing Sheet

AIR DUCTING SYSTEM FOR COOLING AIR IN THE FRONT END OF A MOTOR VEHICLE

BACKGROUND AND SUMMARY OF THE INVENTION

The invention relates to an air ducting system for cooling air in an air duct in a front end of a motor vehicle, which duct is arranged in front of a capsule surrounding an engine compartment in the direction of travel of the motor vehicle and has an essentially vertically positioned air inlet opening at a forward front end wall and an essentially horizontally positioned air outlet opening at an underside of the front end.

An air ducting system of this kind is known from AT-PS 385 245 B. In this known air ducting system, after flowing through a radiator the cooling air strikes the almost vertical rear wall, acting as deflection plate, of the air duct, with the result that it is forced to execute a sharp, almost right-angled deflection. These unfavorable flow conditions reduce the rate of flow of the cooling air and hence the possible cooling capacity.

An object on which the invention is based is to design an air ducting system of the type mentioned at the outset in such a way that higher cooling capacities are made possible by better flow conditions of the cooling air and by an increase in the cooling surface flowed over by the cooling air.

This object is achieved in an air ducting system of the type referred to above, wherein a plurality of aerodynamically shaped guide vanes divide the air duct into a plurality of subducts, said guide vanes being arranged in the air duct to extend as far as the air outlet opening at the underside of the front end, and wherein the guide vanes are of hollow design and are flowed through by a cooling medium transversely to the direction of flow of the cooling air.

In the air ducting system according to the invention, the cooling air is guided constantly by the guide vanes in a plurality of subducts without sharp deflection, with the result that, with other conditions the same, a lower-loss flow occurs which makes possible a higher rate of flow of cooling air and hence a greater cooling capacity. In addition, a considerable increase in the cooling surface flowed over by the cooling air and hence a further improvement of the cooling capacity is achieved, it furthermore being possible to save on the space for a separate radiator or without the need for additional space, to provide an additional radiator, such as a condenser or an oil cooler.

It is already known from MTZ October 1958, pages 347 and 348 to arrange air baffles in a pipe bend behind the radiator of a vehicle cooling system, said air baffles reducing the loss coefficients of the cooling air flow. An armored vehicle is furthermore known from U.S. Pat. No. 2,439,775, in which annular air guide vanes are arranged which serve to deflect cooling air between an air inlet and a fan and simultaneously represent heat exchangers for oil flowing through their interior.

The use of the lateral walls of the air duct as radiator tanks in accordance with certain preferred embodiments represents a considerable cost and space saving. In addition, as part of the capsule, they contribute to the sound insulation of the engine compartment.

In space-saving manner, the design of the air ducting system in certain preferred embodiments includes the capsule wall in the formation of the air duct with its advantages in terms of flow.

The air ducting system according to certain preferred embodiments improves the flow conditions over the entire path between the radiator, situated near to the air inlet opening, and the air outlet opening. There is the possibility, by appropriate design of the cooling ribs in the radiator, to direct the incoming cooling air onto the guide vanes already at this point.

Other objects, advantages and novel features of the present invention will become apparent from the following detailed description of the invention when considered in conjunction with the accompanying drawings.

DETAILED DESCRIPTION OF THE DRAWINGS

Figure 1:
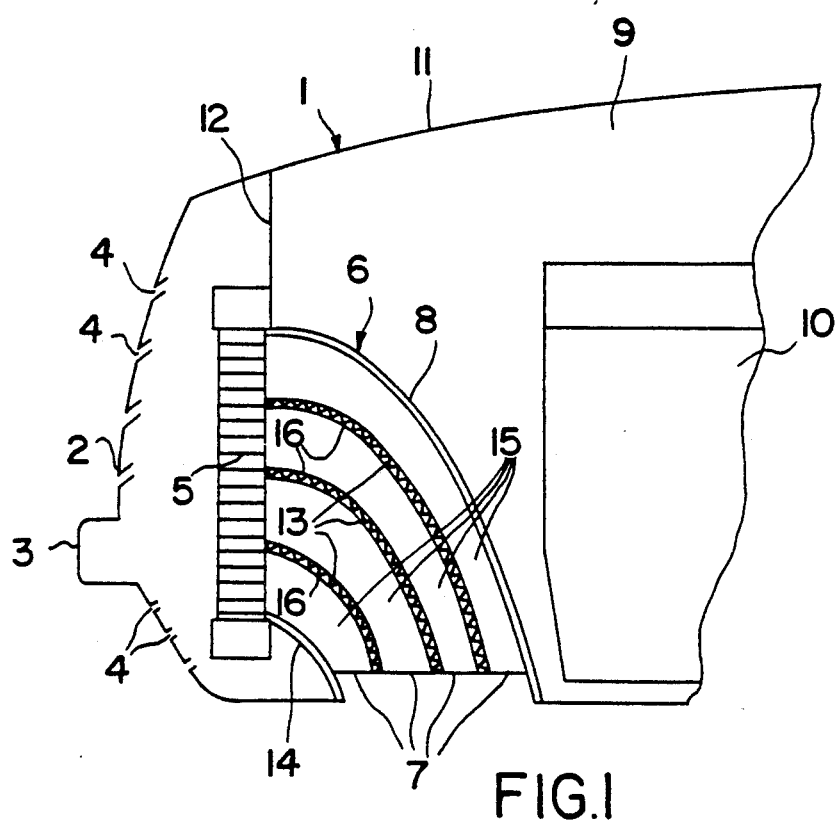
FIG. 1 is a schematic view which shows a longitudinal section through an air ducting system for cooling air arranged in the front end of a motor vehicle, constructed according to a preferred embodiment of the invention.
Figure 2:
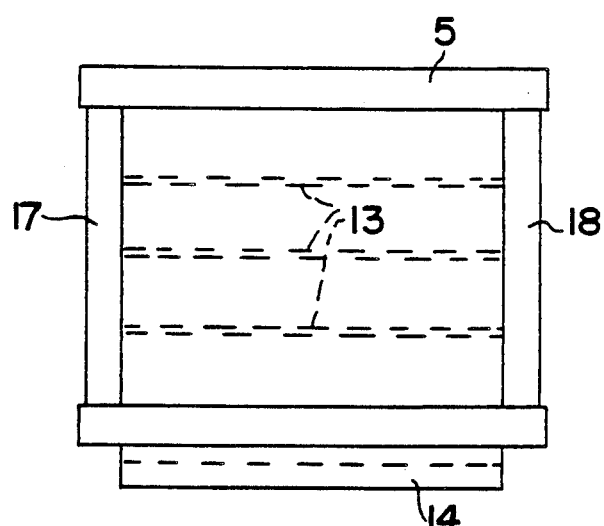
FIG. 2 shows a longitudinal view of the air ducting system of FIG. 1.

A front end 1 of a motor vehicle (not illustrated further) is delimited at the front by a front wall 2 with a bumper 3. In the front wall 2 there are air inlet openings 4 for cooling air above and below the bumper 3. This air flows through a transversely mounted additional radiator 5, such as a condenser of an air-conditioning system or an oil cooler and through a directly adjoining air duct 6 which is curved downwards in the direction of airflow and from which the cooling air emerges through air outlet openings 7 at the underside of the front end. The curved rear terminating wall 8 of the air duct 6 forms part of a capsule which surrounds an engine compartment 9 in which an internal combustion engine 10 is arranged. A wall 12 extending as far as a hood or bonnet 11 completes the forward termination of the engine compartment 9, the latter thus being completely partitioned off with respect to the air flowing in through the air inlet openings 4.

Arranged in the air duct 6 are three aerodynamically designed guide vanes 13 which are curved downwards to match the shaping of the air duct 6 and, together with the rear terminating wall 8 and a short front terminating wall 14, form four subducts 15. The guide vanes 13 extend as far as the level of the air outlet openings 7 so that the subducts 15 open into the openings 7, more specifically at an angle of less than 90° to the horizontal plane formed by the air outlet openings 7, so that the cooling air undergoes a correspondingly smaller deflection in the air duct 6.

The guide vanes 13 are of hollow design and are provided on the inside with cooling ribs 16, thus being able to carry cooling water in their transverse extension. For this purpose, they are connected at their lateral ends to two radiator tanks 17, 18 which simultaneously form the lateral walls of the air duct 6. In this space-saving manner, the guide vanes 13 simultaneously fulfill the function of air guidance and that of a radiator, for example for the cooling water of the internal combustion engine 10. Even when waterbearing cooling ribs which are connected to the lateral radiator tanks 17, 18 are arranged in the individual subducts 15, the air ducting system simultaneously serves as a radiator in the form of a curved radiator network.

Although the invention has been described an illustrated in detail, it is to be clearly understood that the same is by way of illustration and example, and is not to be taken by way of limitation. The spirit and scope of the present invention are to be limited only by the terms of the appended claims.

WHAT IS CLAIMED:

1. Air ducting system for cooling air in an air duct in a front end of a motor vehicle, which duct is arranged in front of at least one wall defining a capsule surrounding an engine compartment in the direction of travel of the motor vehicle and has an essentially vertically positioned air inlet opening at a forward front end wall and an essentially horizontally positioned air outlet opening at an underside of the front end, wherein a plurality of aerodynamically shaped guide vanes divide the air duct into a plurality of sub-ducts, said guide vanes being arranged in the air duct to extend as far as the air outlet opening at the underside of the front end, and wherein the guide vanes are of hollow design and are flowed through by a cooling medium transversely to the direction of flow of the cooling air.

2. Air ducting system according to claim 1, wherein the lateral walls of the air duct form radiator tanks which are connected to the inside of the guide vanes for the purpose of passing through cooling medium.

3. Air ducting system according to claim 2, wherein the lateral walls of the air duct form parts of the capsule wall.

4. Air ducting system according to claim 1, wherein a rear wall of the air duct in the direction of travel is formed by a uniformly curved capsule wall.

5. Air ducting system according to claim 1, wherein an essentially vertical radiator to which the guide vanes are directly connected, is arranged in the air duct between the air inlet opening and the guide vanes.

6. Air ducting system according to claim 1, wherein the cooling medium is cooling water.

7. Air ducting system according to claim 2, wherein a rear wall of the air duct in the direction of travel is formed by a uniformly curved capsule wall.

8. Air ducting system according to claim 2, wherein an essentially vertical radiator to which the guide vanes are directly connected, is arranged in the air duct between the air inlet opening and the guide vanes.

9. Air ducting system according to claim 5, wherein the essentially vertical radiator is a water-filled radiator.

10. Air ducting system according to claim 5, wherein the essentially vertical radiator is an additional radiator other than an engine coolant radiator.

* * * * *